United States Patent [19]

Nouchi et al.

[11] Patent Number: 5,675,690
[45] Date of Patent: Oct. 7, 1997

[54] DISPERSION-FLATTENED SINGLE-MODE OPTICAL WAVEGUIDE WITH LARGE EFFECTIVE MODE SURFACE AREA

[75] Inventors: Pascale Nouchi, Villebon Sur Yvette; Pierre Sansonetti, Palaiseau, both of France

[73] Assignee: Alcatel Submarcom, Clichy, France

[21] Appl. No.: 675,046

[22] Filed: Jul. 3, 1996

[30] Foreign Application Priority Data

Jul. 7, 1995 [FR] France .................................. 95-08252

[51] Int. Cl.$^6$ ...................................... G02B 6/22
[52] U.S. Cl. ............................. 385/127; 385/123
[58] Field of Search ........................... 385/127, 123–124

[56] References Cited

U.S. PATENT DOCUMENTS

| 4,406,518 | 9/1983 | Matsumura et al. | 385/124 |
|---|---|---|---|
| 5,013,131 | 5/1991 | Fotheringham | 385/126 |

FOREIGN PATENT DOCUMENTS

| 0341427A2 | 11/1989 | European Pat. Off. | |
| 24 26 376 | 12/1974 | Germany . | |
| 2116744 | 9/1983 | United Kingdom | 385/127 |

OTHER PUBLICATIONS

Mahmoud et al. "Transmission Characteristics of a Coaxial Optical Fiber Line", Journal of Lightwave Technology, vol. 11, No. 11, pp. 1717–1720 Nov. 1993.

Yangsheng Gao et al, "Attenuation–Optimized Dispersion–Flattened Quadruple–Clad Fibers with Moderate F–Doping in the First Inner Cladding ", *IEEE Photonics Technology Letters*, vol. 4, No. 6, Jun. 1, 1992, pp. 638–641.

L. M. Holmes et al, "Special Profile Nulls Fiber Dispersion at Two Wavelengths", *Laser Focus World*, vol. 26, No. 2, 1 Feb. 1990, p. 121.

F. Ruhl, "Cutoff Decomposition on Multiply Clad Fibers", *Journal of Lightwave Technology*, vol. 4, No. 11, 1 Nov. 1986, pp. 1651–1654.

*Primary Examiner*—John D. Lee
*Assistant Examiner*—Ellen E. Kang
*Attorney, Agent, or Firm*—Sughrue, Mion, Zinn, Macpeak & Seas, PLLC

[57] ABSTRACT

A single-mode optical waveguide comprises an optical core and a cladding surrounding the optical core having a predetermined refractive index. The core comprises a central area that has a refractive index lower than the predetermined refractive index and annular area around the central area that has a refractive index higher than the predetermined refractive index. Between the peripheral annular area and the cladding is at least one composite annular area made up of two successive annular areas respectively having refractive indices lower than and higher than the predetermined refractive index.

2 Claims, 2 Drawing Sheets

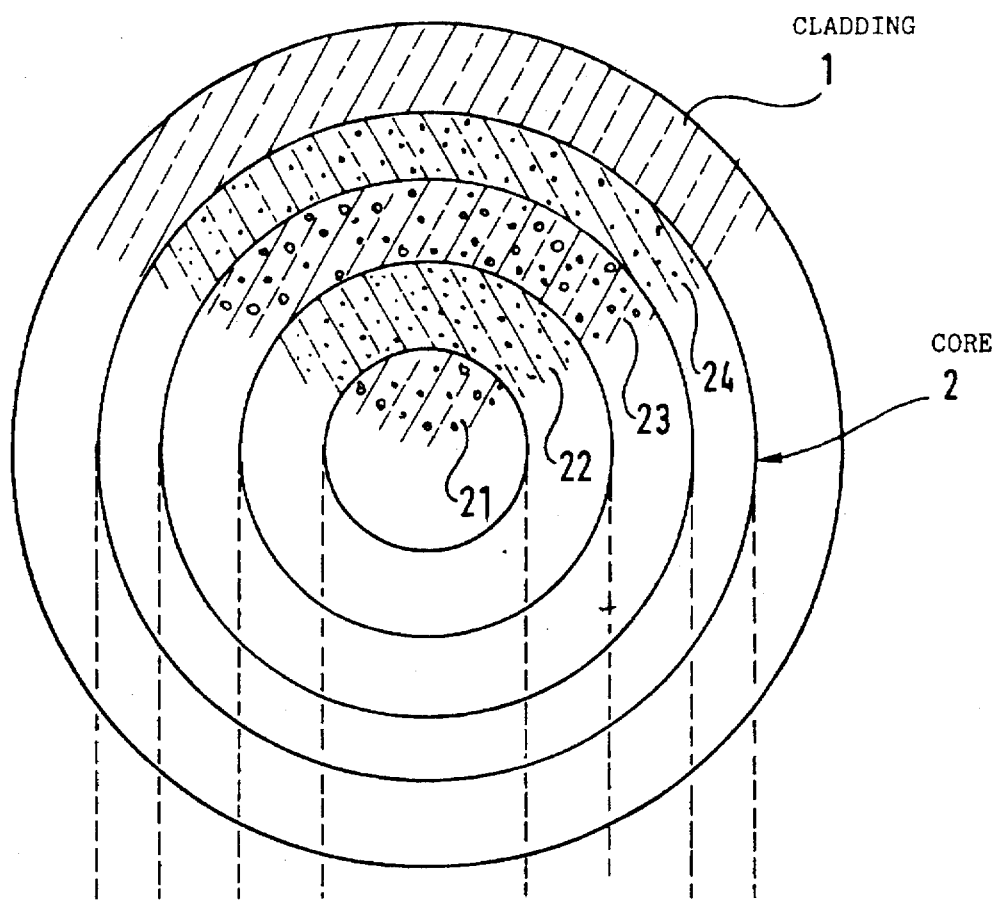
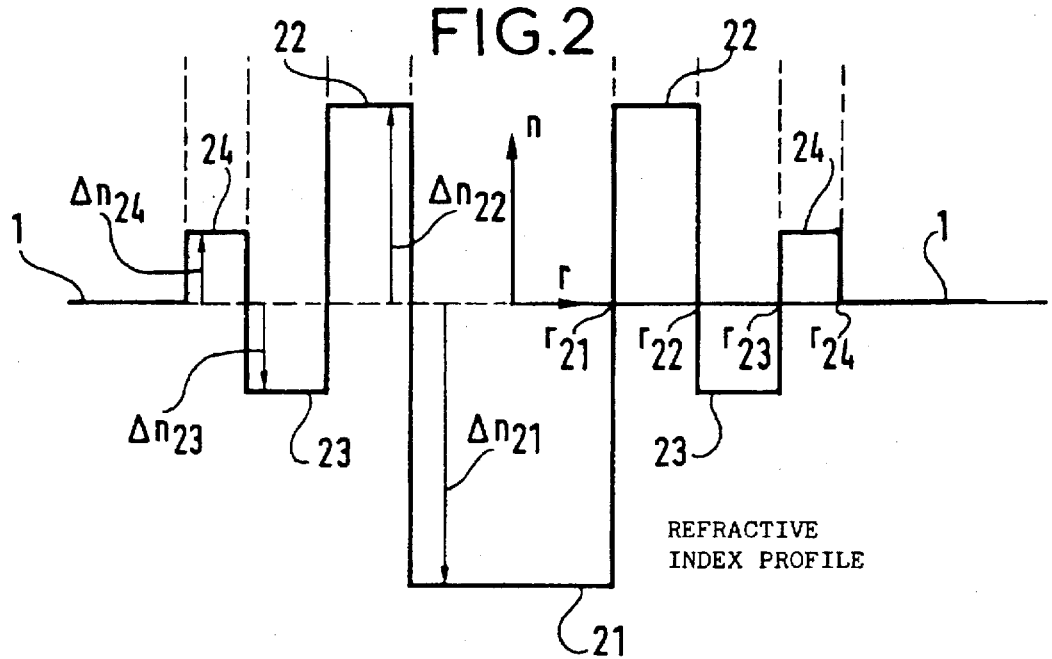

REFRACTIVE INDEX PROFILE

DISPERSION-FLATTENED SINGLE-MODE OPTICAL WAVEGUIDE WITH LARGE EFFECTIVE MODE SURFACE AREA

BACKGROUND OF THE INVENTION

1. Field of the Invention

The present invention concerns a single-mode optical waveguide such as an optical fiber typically intended to be used as a long-distance communication link. Applications of the invention include submarine links. To be more precise, the invention concerns a dispersion-flattened single-mode optical fiber having a large effective mode surface area.

2. Description of the Prior Art

In a dispersion-flattened single-mode optical fiber there is substantially no chromatic dispersion of the transmitted wave at the operating wavelength. It can be shown that there is no chromatic dispersion in silica at and only at the wavelength $\lambda$ equal to 1.27 µm. However, for a fiber intended to be used to provide a long-distance link it is more advantageous to transmit at a wavelength $\lambda=1.55$ µm since at this wavelength there is minimal attenuation of the light transmitted. On the other hand, for $\lambda=1.55$ µm it is necessary to compensate the non-null chromatic dispersion of the silica, in particular by using an appropriate structure of the core and the cladding of the optical fiber. The expression "dispersion-flattened optical fiber" refers to a fiber in which the chromatic dispersion is substantially eliminated by compensating the intrinsic chromatic dispersion of silica for a wavelength other than 1.27 µm.

The effective mode surface area $S_{\it eff}$ of a fiber is defined by:

$$S_{\it eff} = \frac{2\pi \left( \int_0^\infty \Psi^2(r) \cdot r \cdot dr \right)^2}{\int_0^\infty \Psi^4(r) \cdot r \cdot dr}$$

where $\Psi(r)$ is a scalar function of field distribution in the fiber and r denotes the polar distance in polar coordinates of a point in a frame of reference transverse to and centered on the fiber. It can be shown that transmission quality in the fiber is directly proportional to the effective mode surface area $S_{\it eff}$. Accordingly, to improve transmission quality in the fiber, the advantage of which is to reduce the number of repeaters on the link and therefore the cost of the installation, it is particularly advantageous to have the greatest possible effective mode surface area.

There are two prior art index profiles for obtaining a dispersion-flattened single-mode fiber with a large effective mode surface area. These are the "trapezium+ring profile" and the "buried central area+ring profile". A profile is a diagram of the index in the core and cladding of the fiber as a function of the polar distance relative to the center point of the fiber. The index is a function only of this distance and does not depend on the angular coordinate, the central axis of the fiber defining an axis of revolution for each layer of the core and of the cladding.

The "trapezium+ring" profile described in U.S. patent application Ser. No. 08/637784 of 2 May 1996 defines a fiber comprising:

a cladding having a predetermined refractive index, and
a core comprising, firstly, a central area having a refractive index that is higher than the refractive index of the cladding and that decreases from a given value of the polar distance until it is equal to the refractive index of the cladding and, secondly, a ring around the central area that has a refractive index higher than the refractive index of the cladding and that is separated from the central area by a gap in which the refractive index is equal to the refractive index of the cladding.

This "trapezium+ring" profile offers an effective mode surface area $S_{\it eff}$ up to 85 µm². Fibers with this profile have the major drawback of being subject to microcurvature losses, however.

The "buried central area+ring" profile described in the document "Transmission Characteristics of a Coaxial Fiber Line" published in the Journal of Lightwave Technology, vol. 11, n° 11, November 1993, pages 1717–1720, defines a fiber comprising:

a cladding having a predetermined refractive index, and
a core comprising a central area having a refractive index lower than the refractive index of the cladding and an annular area around the central area that has a refractive index higher than the refractive index of the cladding.

This "buried central area+ring" profile offers an effective mode surface area $S_{\it eff}$ up to 90 µm². Fibers having this profile are not optimal, however, because of high intrinsic losses due to the high index differences.

Thus both prior art types of dispersion-flattened fiber having a large effective mode surface area are not entirely satisfactory with regard to their attenuation, either because of microcurvature losses or because of intrinsic losses. The invention is therefore directed to remedying these drawbacks by providing a dispersion-flattened optical fiber having a large effective mode surface area and entirely satisfactory properties in respect of all attenuation parameters.

SUMMARY OF THE INVENTION

The invention consists in a single-mode optical waveguide comprising an optical core and a cladding surrounding said optical core and having a predetermined refractive index, wherein said core comprises a central area that has a refractive index lower than said predetermined refractive index, an annular area around said central area that has a refractive index higher than said predetermined refractive index and at least one composite annular area between said peripheral annular area and said cladding made up of two successive annular areas respectively having refractive indices lower than and higher than said predetermined refractive index.

The refractive index may vary as a function of a polar distance defined relative to the center of the waveguide in at least one of the central and annular areas.

Other features and advantages of the present invention will emerge more clearly from a reading of the following description with reference to the corresponding appended drawings.

BRIEF DESCRIPTION OF THE DRAWINGS

FIG. 1 is a cross-section view of a single-mode optical waveguide of the invention.

FIG. 2 is an index profile diagram associated with the waveguide shown in FIG. 1 for a first embodiment of the invention.

DETAILED DESCRIPTION OF THE PREFERRED EMBODIMENTS

Figure 3:
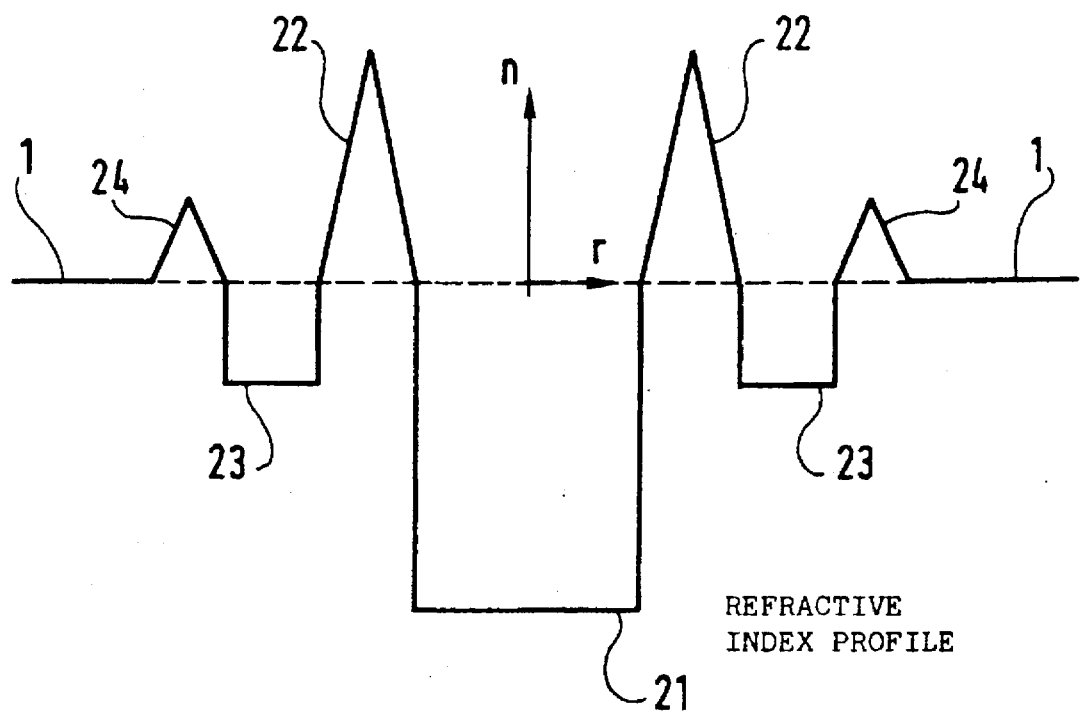
FIG. 3 is an index profile diagram associated with the waveguide shown in FIG. 1 for a second embodiment of the invention.

Referring to FIG. 1, a single-mode optical waveguide or optical fiber of the invention has an optical cladding 1 surrounding an optical core 2. The optical core 2 comprises a circular central area 21 surrounded by three successive concentric annular areas 22, 23 and 24. The optical fiber is made by drawing a preform obtained by successive deposition of layers of appropriately doped silica. In one embodiment of the invention shown in FIG. 2, which represents the index n as a function of the distance r in polar coordinates from the center of the fiber, the central area 21 has a constant refractive index less than the refractive index of the cladding 1, and the first concentric annular area 22 around the central area has a constant refractive index higher than the refractive index of the cladding 1. Between the peripheral annular area 22 and the cladding 1 is a composite annular area comprising successive inner and outer concentric annular areas 23 and 24, with constant refractive indices respectively lower than and higher than the refractive index of the cladding 1. The invention is thus distinguished from the prior art described in the previously mentioned document "Transmission Characteristics of a Coaxial Optical Fiber Line" by this composite annular area made up of the successive inner and outer concentric annular areas 23 and 24 having refractive indices respectively lower than and higher than the refractive index of the cladding 1. The physical properties behind the considerable advantage procured by the invention are as follows. It can be shown that the chromatic dispersion M of an optical fiber is given to a good approximation by the sum of the material dispersion M1 equal to the dispersion obtained for a plane wave in a homogeneous medium having a given index and the waveguide dispersion M2 equal to the dispersion obtained by neglecting the dependence of the index on the wavelength. This is written:

$$M = M1 + M2$$

It can also be shown that:

$$M1 = -\lambda/c \cdot (\partial^2 n/\partial \lambda^2), \text{ and}$$

$$M2 = -[\Delta n/\lambda c] \cdot V(\partial^2(VB)/\partial V^2),$$

where $\lambda$ is the wavelength of the light wave substantially equal to 1.55 μm, c is the speed of light, n is an index value variable, $\Delta n$ is the index difference between the maximal index of the core and the index of the cladding and $V(\partial^2(VB)/\partial V^2)$ is a term characterizing the dispersion of the waveguide, V being the normalized frequency and B the normalized effective index, the effective index being the index "seen" by the light wave propagating in the core. For the fiber to be free of chromatic dispersion the value of the sum (M1+M2) must be made equal to 0 and this means that the value M1 must be canceled by an equal and opposite value M2. In the previously mentioned document "Transmission Characteristics of a Coaxial Optical Fiber Line" the optical fiber described is such that the value of $V(\partial^2(VB)/\partial V^2)$ in the equation:

$$M2 = -[\Delta n/\lambda c] \cdot V(\partial^2(VB)/\partial V^2),$$

is small, which requires $\Delta n$ to be decreased in order for the value of M2 to compensate the value of M1. A high index difference between the core and the cladding of the optical fiber leads to high intrinsic losses.

In the context of the invention, the value of $V(\partial^2(VB)/\partial V^2)$ is sufficiently high for the index difference $\Delta n$ between the core and the cladding of the fiber to be small. As a result the intrinsic losses are greatly reduced.

One embodiment of an optical waveguide in accordance with the invention is described below by way of non-limiting example. In this embodiment, as shown in FIG. 2, $\Delta n_i$ and $r_i$ respectively denote a variation of the index relative to the index of the cladding 1 and a radius measured at an end point of each of the areas forming the core 2, the suffix i identifying each of the areas 21, 22, 23 and 24. The implementation gives:

$$\Delta n_{21} = -5.5 \cdot 10^{-3}, \Delta n_{22} = 11 \cdot 10^{-3}, \Delta n_{23} = -5.5 \cdot 10^{-3}, \Delta n_{24} = 5.5 \cdot 10^{-3},$$

and $$r_{21} = 2.1 \text{ μm}, r_{22} = 4.2 \text{ μm}, r_{23} = 7.06 \text{ μm and } r_{24} = 8.4 \text{ μm}$$

The index profile proposed by the invention gives the optical fiber an effective mode surface area substantially equal to 85 μm².

The index profile shown in FIG. 3, a variation on FIG. 2, is such that in each of the two areas 22 and 24 the refractive index n varies as a function of the polar distance r whilst remaining at all times higher than the refractive index of the cladding 1, producing triangular shapes. This variant is not limiting on the invention, which provides that the refractive index in at least one area 21, 22, 23 and 24 can vary with the polar distance r in accordance with a given geometry such as a triangle, lozenge, ogive curve, etc. The following characteristics are nevertheless complied with. In the areas 21 and 23 the refractive index of the core is lower than the refractive index of the cladding 1. In the areas 22 and 24 the refractive index of the core is higher than the refractive index of the cladding 1.

Although the foregoing description is limited to a single composite annular area made up of two successive concentric annular areas 23 and 24 respectively having refractive indices lower than and higher than the refractive index of the cladding 1, a plurality of successive composite annular areas may be used each made up of inner and outer concentric annular areas respectively having refractive indices lower than and higher than the refractive index of the cladding 1.

Another important advantage of the invention is the low spectral slope of the chromatic dispersion obtained, equal to 0.065 ps/nm²/km in the above embodiment. This means that the chromatic dispersion M fluctuates little with the wavelength $\lambda$ used, which offers the possibility of wavelength multiplexing, typically at wavelengths near $\lambda = 1.55$ μm.

There is claimed:

1. A single-mode optical waveguide comprising an optical core (2) and a cladding (1) surrounding said optical core, said cladding having a predetermined refractive index, wherein said core comprises a central area (21) that has a refractive index lower than said predetermined refractive index, an annular area (22) around said central area that has a refractive index higher than said predetermined refractive index, and at least one composite annular area between said annular area and said cladding, said composite annular area comprising two successive annular areas (23, 24) respectively having refractive indices lower than and higher than said predetermined refractive index.

2. A single-mode optical waveguide according to claim 1, wherein, in at least one of said central area (21) and said annular areas (22, 23, 24), the refractive index varies as a function of a polar distance defined relative to the center of the waveguide.

* * * * *